(12) United States Patent
Scarsbrook

(10) Patent No.: US 8,323,461 B2
(45) Date of Patent: Dec. 4, 2012

(54) ELECTROCHEMICAL APPARATUS HAVING A FORCED FLOW ARRANGEMENT

(75) Inventor: Geofferey Alan Scarsbrook, Berkshire (GB)

(73) Assignee: Electrolytic Ozone, Inc., Wilmington, MA (US)

( * ) Notice: Subject to any disclaimer, the term of this patent is extended or adjusted under 35 U.S.C. 154(b) by 767 days.

(21) Appl. No.: 12/514,294

(22) PCT Filed: Nov. 9, 2007

(86) PCT No.: PCT/IB2007/054562
§ 371 (c)(1),
(2), (4) Date: Jul. 6, 2009

(87) PCT Pub. No.: WO2008/056337
PCT Pub. Date: May 15, 2008

(65) Prior Publication Data
US 2010/0032312 A1 Feb. 11, 2010

(30) Foreign Application Priority Data

Nov. 10, 2006 (GB) .................................. 0622483.6

(51) Int. Cl.
*C25B 9/10* (2006.01)
(52) U.S. Cl. ........................................ 204/263; 205/626
(58) Field of Classification Search .................. 204/263; 205/626
See application file for complete search history.

(56) References Cited

U.S. PATENT DOCUMENTS

| 7,438,790 | B2 * | 10/2008 | Hosonuma et al. | ........... 204/294 |
|---|---|---|---|---|
| 2005/0142402 | A1 | 6/2005 | Skoczylas et al. | |
| 2008/0053840 | A1 * | 3/2008 | Arihara et al. | ................ 205/626 |

FOREIGN PATENT DOCUMENTS

| DE | 100 25 167 A1 | 12/2001 |
|---|---|---|
| EP | 0 822 269 A1 | 2/1998 |
| EP | 1 754 804 A1 | 2/2007 |
| JP | 2002-143851 A | 5/2002 |
| JP | 2005-177672 A | 7/2005 |
| JP | 2005177672 A * | 7/2005 |
| JP | 2005-336607 A | 12/2005 |
| WO | 03/052174 A2 | 6/2003 |
| WO | 2005/095282 A1 | 10/2005 |
| WO | 2005/106079 A1 | 11/2005 |
| WO | 2005/113860 A1 | 12/2005 |
| WO | 2007/017976 A1 | 2/2007 |

OTHER PUBLICATIONS

International Search Report for PCT/IB2007/054562 dated Mar. 19, 2008 (3 pages).
Kraft et al., "Electrochemical Ozone Production Using Diamond Anodes and a Solid Polymer Electrolyte," Electrochemistry Communications, vol. 8, No. 5, May 2006, pp. 883-886.

* cited by examiner

*Primary Examiner* — Nicholas A. Smith
(74) *Attorney, Agent, or Firm* — Bryan Cave LLP

(57) ABSTRACT

The present invention provides an electrochemical apparatus for processing a fluid comprising: an electrode; a solid electrolyte; and means for providing forced flow through the apparatus of a fluid to be processed, wherein the apparatus is arranged such that when the fluid to be processed is introduced into the apparatus there exists at least one three phase interface between the electrode, the solid electrolyte and the fluid to be processed and such that the fluid forming part of the three phase interface undergoes forced flow through the apparatus, and methods in which the electrochemical apparatus is used.

13 Claims, 8 Drawing Sheets

ELECTROCHEMICAL APPARATUS HAVING A FORCED FLOW ARRANGEMENT

CROSS-REFERENCE TO RELATED APPLICATIONS

This application was filed under 35 U.S.C. §371 as a National Stage application of PCT International Application Serial No. PCT/IB2007/054562, filed Nov. 9, 2007. PCT International Application Serial No. PCT/IB2007/054562 claims priority to UK Patent Application GB 0 622 483.6, filed Nov. 10, 2006, which is incorporated herein by reference in its entirety.

The present invention relates to an electrochemical apparatus for processing a fluid, wherein the apparatus is arranged to have a three phase interface and to provide forced flow of the fluid to be processed. The invention also relates to a method for use of such an apparatus in the production of ozone by electrolysis of water.

All documents referred to herein are hereby incorporated by reference.

Ozone has a very strong oxidising power. It is used in a number of fields including sterilisation, decolourisation and deodorisation. Electrolysis of water, preferably pure water, produces ozone through the following anode reaction:

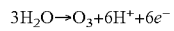

$$3H_2O \rightarrow O_3 + 6H^+ + 6e^-$$

The ozone produced may be dissolved in water, so called ozone-water. Ozone-water has been used in sterilisation in fields such as food processing, sanitary facilities and medical services. Ozone sterilises by oxidation, which inhibits both organic and inorganic matter.

The use of ozone-water as a sterilising agent has a number of benefits including the release of non-toxic by-products, oxygen and water. In contrast, ethylene oxide, a common sterilisation agent for medical device sterilisation, is very toxic. Consequently, sterilisation with ethylene oxide requires a long aeration time.

It is conventional to use a $PbO_2$ anode for ozone generation. However, this anode material is subject to erosion under the application of very large current densities. In addition, it is undesirable to treat drinking and washing water with an electrode comprising lead. Diamond electrodes, in particular boron-doped diamond electrodes, are useful for electrochemical applications owing to a number of properties, which are significantly different to the properties of other electrode materials such as glassy carbon or platinum. These properties include the high hardness, high thermal conductivity and chemical inertness associated with diamond and the wide electrochemical potential window of conductive diamond.

The use of a perforated conductive diamond electrode for ozone generation by electrolysis of water is described in Japanese Publication No. 2005-336607. Such electrodes comprise a diamond plate with circular apertures positioned adjacent to a proton exchange membrane (PEM). The electrode is pressed against the PEM, and the electrolysis process occurs primarily in the aperture of the electrode and specifically at the edges of the aperture, where the diamond plate is in contact with the PEM. As such the electrolysis of water takes place primarily at a three phase interface between the diamond electrode, the PEM and the water.

A problem of the prior art electrodes in which there is a three phase interface arrangement, such as in the ozone generation reaction mentioned above, is the removal of reaction products, particularly gas bubbles, from the reaction site (that is, the three phase interface) to allow for fresh reactants to undergo an electrochemical reaction at the reaction site.

Where a three phase interface is provided by having circular apertures in a plate pressed against a solid electrolyte (such as in Japanese Publication No. 2005-336607), the smaller the apertures that are used the higher the probability of reaction products becoming lodged in the circular apertures and inhibiting the electrochemical reaction. Although elongate apertures are far less likely to suffer from this inhibition, since the reaction products may escape more easily, product inhibition still remains a problem.

The object of the present invention is to provide an electrochemical apparatus which provides forced flow of a fluid to be processed through the apparatus, thereby eliminating the problem of reaction products becoming trapped at the three phase interface reaction site and thereby avoiding the problem of inhibition of the electrochemical reaction.

In a first aspect of the present invention, there is provided an electrochemical apparatus for processing a fluid comprising:
  (i) an electrode;
  (ii) a solid electrolyte; and
  (iii) means for providing forced flow through the apparatus of a fluid to be processed,
wherein the apparatus is arranged such that when the fluid to be processed is introduced into the apparatus there exists at least one three phase interface between the electrode, the solid electrolyte and the fluid to be processed and such that the fluid forming part of the three phase interface undergoes forced flow through the apparatus.

An advantage of the electrochemical apparatus of the present invention is that it enables reaction products to be swept away from the reaction site (that is, the three phase interface) by forcing a flow of the fluid to be processed through the apparatus. This reduces the problem of inhibition of the electrochemical reaction caused by trapping of reaction products, thereby increasing the rate of fluid processing achievable by the apparatus. An additional advantage of the forced flow configuration is that the fluid to be processed flowing through the apparatus will undergo a more uniform electrochemical reaction as all the fluid passing through the apparatus will come into close contact with the reaction site. In the case of the electrolysis of water, for example, the water to be processed will be more uniformly ozonised.

A further advantage of the apparatus of the present invention is that the fluid passes as close as possible to the reaction site (that is, the three phase interface). The apparatus is therefore useful in the treatment of water, particularly where ozonisation occurs as ozone has a short lifetime in water.

The electrochemical apparatus may comprise any suitable means for providing forced flow through the apparatus of a fluid to be processed. For example, the apparatus may comprise a pump, a gravity feed system or any other means of forcing the flow.

The fluid forming part of the three phase interface undergoes forced flow though the apparatus. This means that the fluid forming one of the phases that comprise the three phase interface undergoes forced flow past the three phase interface. Advantageously, the fluid flow through the apparatus and past the three phase interface is greater than about 0.1 $cm^3$ per second per $cm^2$ of passage cross section per cm of passage length, preferably greater than about 1 $cm^3$ per second per $cm^2$ of passage cross section per cm of passage length, preferably greater than about 10 $cm^3$ per second per $cm^2$ of passage cross section per cm of passage length, preferably greater than about 100 $cm^3$ per second per $cm^2$ of passage cross section per cm of passage length. The term "passage" is used in this context to describe the path taken by the fluid through the apparatus, the dimension and shape of which will depend on the particular arrangement of the apparatus as is described in more detail below.

In order to achieve forced flow, advantageously, the fluid enters the apparatus under pressure. Preferably the applied pressure above atmospheric pressure at the point of entry of the fluid into the apparatus is greater than about 0.1 bar, preferably greater than about 0.2 bar, preferably greater than about 0.5 bar, preferably greater than about 0.8 bar, preferably greater than about 1 bar, preferably greater than about 5 bar, preferably greater than about 10 bar. Therefore, advantageously, the apparatus of the present invention is suitable for use in a standard domestic water supply system where pressures from the mains supply of up to about 6 bar can easily be provided.

Advantageously, the pressure drop between the point of entry of the fluid into the apparatus, which may, for example be an inlet manifold, and the point of exit of the fluid from the apparatus, which may, for example be an outlet manifold, is less than about 10 bar, preferably less than about 8 bar, preferably less than about 5 bar, preferably less than about 3 bar, preferably less than about 1 bar, preferably less than about 0.8 bar, preferably less than about 0.5 bar, preferably less than about 0.2 bar.

In the electrochemical apparatus of the present invention, the solid electrolyte may be, for example, a polymer electrolyte membrane. Preferably, the solid electrolyte is a proton exchange membrane (PEM). A PEM is especially useful where the apparatus is being used for processing water by producing ozone at the three phase interface. The PEM may be constructed from any suitable material known in the art including Nafion® film (N117, Dupont) PEM.

There may be more than one three phase interface formed in the apparatus when the fluid to be processed is introduced. For example, there may be 1 or more, 2 or more, 3 or more, 4 or more, 5 or more, about 10 or more, about 15 or more, about 20 or more, about 30 or more, about 40 or more, about 50 or more or about 100 or more three phase interfaces present in the apparatus. The exact number of three phase interfaces will depend on the particular arrangement of the electrode and the solid electrolyte within the apparatus.

The three phase interface formed in the apparatus when the fluid to be processed is introduced may be of any shape. For example, there may be a single point three phase interface or an elongate three phase interface. Where there is more than one three phase interface present in the apparatus, these may be of the same or different shapes and of the same or different sizes.

Preferably, the at least one three phase interface is elongate. An elongate three phase interface may be linear or curved.

Where the three phase interface is elongate, the apparatus is preferably arranged such that the fluid forming part of the three phase interface undergoes forced flow along a majority of the length of the interface. Preferably, the fluid undergoes forced flow along greater than about 50%, preferably greater than about 75%, preferably greater than about 85%, preferably greater than about 90%, preferably greater than about 95%, preferably about 100% of the length of the elongate interface. In this way, inhibition of reaction products formed at the three phase interface may be minimised and the rate of production of the reaction products may be increased.

The electrode forming part of the three phase interface in the electrochemical apparatus of the present invention may be an anode or a cathode. Preferably, the electrode is an anode and this is particularly advantageous where the electrochemical apparatus is being used for processing water by producing ozone at the three phase interface.

The apparatus of the present invention may comprise an electrode made of any suitable material known in the art. Preferably, the electrode comprises electrically conducting diamond, which has advantages of having high hardness, high thermal conductivity and chemical inertness. Electrically conducting diamond also has a wide electrochemical potential window.

Preferably the electrode used in the apparatus of the present invention consists essentially of electrically conducting diamond. The term "consists essentially of" as used herein requires that the functional behaviour of the electrode is provided by diamond and the dopant(s) within it, and in particular that there is no other identifiable material such as a substrate, providing useful function to the electrode. This term is not intended to preclude the possibility that other components or features may be added to the electrode, for example one or more electrical connections may be added using metallization, brazing or other bonding means.

The use of an electrode which consists essentially of electrically conducting diamond is advantageous because, as compared to diamond coated electrodes, electrodes which are formed from solid diamond have increased operational lifetimes. More specifically, diamond coated electrodes suffer from the problem of pin-holes which allow the liquid being treated to penetrate the coating and electrochemically attack the interface between the diamond coating and substrate resulting in delamination.

A further advantage of using an electrode which consists essentially of a electrically conducting diamond is that a wider variety of complex shaped diamond plates may be used as compared to where the electrode is formed from a diamond coated plate. This is because where the electrode is a diamond coated electrode, the shape of the plates is limited by virtue of the fact that it is very difficult to coat substrates having a complex shape.

Where the electrode used in the apparatus is electrically conducting diamond, the electrically conducting diamond is preferably in the form of a plate.

Electrically conducting diamond may be generated by any method known in the art, but is preferably produced by the addition of dopant elements, e.g. lithium, beryllium, nitrogen, phosphorous, sulfur, chlorine, arsenic, selenium or boron, preferably boron. As used herein, the term "electrically conducting" means having an electrical resistivity of about $10^6$ $\Omega$cm or less, preferably about $10^5$ $\Omega$cm or less, preferably about $10^4$ $\Omega$cm or less, preferably about $10^3$ $\Omega$cm or less, preferably about $10^2$ $\Omega$cm or less. Doping can be achieved by implantation, but is preferably achieved by incorporation of the dopant element during synthesis of the diamond, e.g. during synthesis of the diamond by chemical vapour deposition (CVD) as described in EP 0 822 269 or WO 03/052174. The maximum concentration of the doping elements in the diamond is preferably about $3 \times 10^{21}$ atoms per cm$^3$ or less, preferably about $1 \times 10^{21}$ atoms per cm$^3$ or less, preferably about $3 \times 10^{20}$ atoms per cm$^3$ or less, preferably about $1 \times 10^{20}$ atoms per cm$^3$ or less, preferably about $3 \times 10^{19}$ atoms per cm$^3$ or less, preferably about $1 \times 10^{19}$ atoms per cm$^3$ or less. The minimum concentration of the doping elements in the diamond is about $1 \times 10^{17}$ atoms per cm$^3$ or more, preferably about $3 \times 10^{17}$ atoms per cm$^3$ or more, preferably about $1 \times 10^{18}$ atoms per cm$^3$ or more, preferably about $3 \times 10^{18}$ atoms per cm$^3$ or more.

The electrically conducting diamond may be single crystal synthetic diamond, natural Type IIb diamond or polycrystalline diamond, and is preferably polycrystalline diamond. The diamond may be natural diamond, high pressure high temperature (HPHT) synthetic diamond or CVD diamond. Preferably, the diamond is CVD diamond.

Where the electrode comprises an electrically conducting diamond plate, the diamond plate is preferably CVD polycrystalline diamond. CVD polycrystalline diamond layers typically have a nucleation face, which conforms to the profile of the substrate on which it is grown. Therefore, the nucleation face is generally substantially flat and relatively smooth. CVD polycrystalline diamond layers also typically have a growth face, which has crystal facets and is generally substantially rough. Typically the surface roughness, $R_a$, of an as-grown CVD polycrystalline diamond layer is about 10% of the as-grown thickness of the layer.

Where the diamond plate is CVD polycrystalline diamond, either the nucleation face or the growth face or both may be used in an unprocessed form or in a processed form. Using the growth face and/or nucleation face in an unprocessed form has an advantage of being easier and cheaper to fabricate, requiring less production steps. Using the growth face and/or nucleation face in a processed form has an advantage of providing better performance, for example, processing the growth face typically produces a flatter surface, while processing the nucleation face typically improves the quality of the diamond exposed at the surface. The solid electrolyte, such as a PEM, may be present immediately adjacent to either the front surface or the back surface of the diamond plate. An advantage of placing the solid electrolyte immediately adjacent to an unprocessed growth face of a diamond plate, is that better performance may be obtained from the electrode. An advantage of placing the solid electrolyte immediately adjacent to an unprocessed nucleation face of a diamond plate, is that the nucleation face is less rough than an as-grown growth surface and hence there is a better contact between the solid electrolyte and the diamond plate. In some applications, the solid electrolyte is preferably present immediately adjacent to the nucleation face of the diamond plate. In other applications, such as where the growth face is processed, the solid electrolyte may preferably be present immediately adjacent the growth face.

Preferably, the electrode comprises at least one aperture. The formation of an aperture in the electrode has an advantage of providing a high density of three phase interfaces, which can increase the rate of production of the reaction products and hence can increase the processing rate of the fluid. The presence of at least one aperture is particularly preferable where the electrode comprises an electrically conducting diamond plate.

The aperture may be any shape, for example, circular, square or elongate.

Preferably, the at least one aperture is elongate. As used herein, the term "elongate aperture" refers to an opening such as a gap, slot or slit which has a length which is greater than its maximum width. Preferably, the ratio of the maximum length to the maximum width (i.e. the aspect ratio) is about 2 or more, preferably about 3 or more, preferably about 5 or more, preferably about 7 or more, preferably about 10 or more, preferably about 12 or more, preferably about 15 or more, preferably about 20 or more, preferably about 30 or more, preferably about 50 or more, preferably about 70 or more, preferably about 100 or more, preferably about 200 or more, preferably about 500 or more. Preferably, the ratio of the maximum length to the maximum width is from about 10 to about 200, preferably from about 20 to about 100.

An aperture, whether or not elongate, may be made in the electrode using any suitable cutting device. Where the electrode is diamond, an aperture may be cut using a laser and positioning the diamond on a computer-numerically-controlled x-y table. Laser cutting is a preferred means of processing diamond and is particularly preferred in the present application. A typical laser cut aperture is wider at the entry face and narrower at the exit face, thereby resulting in tapered aperture walls. This effect is called the "kerf angle" and the kerf angle is typically about 3° to 12° full angle. As a consequence of the kerf angle, it is common for laser cut aperture walls not to be perfectly normal to the major face (or entry face) of diamond. However, it is possible to obtain laser cut aperture walls which are orthogonal to the major face (or entry face) of the diamond by using an asymmetric cut so that the whole of the kerf angle is in the wasted material.

There may be at least one aperture, preferably at least one elongate aperture, present in the electrode. For example, there may be 2 or more, 3 or more, about 5 or more, about 10 or more, about 15 or more, about 25 or more, about 50 or more, about 80 or more, about 100 or more, about 130 or more, about 160 or more, about 200 or more, about 300 or more, about 500 or more, or about 1000 or more apertures present in the electrode. Preferably the number of apertures present in the electrode is from 20 to 150. The exact number of apertures used is dictated by the aperture size, the maximum spacing between apertures and the dimensions of the working area of the electrode.

Where the at least one aperture is elongate, it may be straight-sided or curved. An advantage of having a straight-sided elongate aperture is that it is easier to cut and also, where the electrode is diamond, it reduces the number of stress concentration steps that are present in the diamond.

As used herein, the term "straight-sided" as used in relation to an elongate aperture means sides that are straight and preferably parallel between the ends of the elongate aperture. A curved elongate aperture comprises at least one curve, i.e. the elongate aperture may curve, at least once, through an angle e.g. 30°, 45°, 60°, 90°, 120° or 150°. The curve or curves in the elongate aperture may have sharp corners, or may have corners with a smooth radius of curvature. When the electrode is diamond, particularly a diamond plate, it is particularly advantageous to have sharp-cornered curves as this leads to a reduction in the number of stress concentration steps in the diamond due to the absence of curved edge length. Preferably at least the longest sides of the elongate aperture are straight.

The ends of an elongate aperture may also be straight or curved and are preferably curved. A straight-sided elongate aperture has a longitudinal axis running from one end of the elongate aperture to the other end.

Where the electrode comprises at least one aperture, preferably the electrode has a high edge length per unit working area of the electrode. When discussing the edge length of an aperture it is meant the edge between either the front or the back surface of the electrode and the aperture walls. Where the electrode is a diamond plate, the "front surface" is preferably the growth face of the diamond, whereas the "back surface" is preferably the nucleation face of the diamond.

As used herein the "aperture edge length" refers to the total length of the perimeter of an elongate aperture as measured along the line of intersection between the aperture and either the front surface of the electrode or the back surface of the electrode.

The edge referred to in "aperture edge length" is the line formed by the intersection of the surface of the elongate aperture and either the front surface of the electrode or the back surface of the electrode. This line is where, in use, the electrode, the solid electrolyte and the fluid to be processed meet to form a three phase interface.

Thus the edge length of an aperture is the distance measured along the edge of the aperture formed between the front surface of the electrode and the aperture walls. Alternatively, the edge length of an aperture is the distance measured along the edge of the aperture formed between the back surface of the electrode and the aperture walls. In many embodiments of the present invention, the edge length of an aperture measured with respect to the front surface of the electrode will be the same as the edge length of an aperture measured with respect to the back surface of the electrode. However, if the aperture walls are tapered through the thickness of the electrode, the edge length of an aperture measured with respect to the front surface may differ from the edge length measured with respect to the back surface.

When there is more than one aperture present, the edge length of the apertures is the sum of the individual edge lengths of all the apertures measured between either the front surface or the back surface of the electrode and the aperture walls.

As used herein, the "aperture edge length per unit working area of the electrode" is an average which may be measured by calculating the total edge length of the apertures formed between the front surface and the aperture walls and dividing this value by the area of the front surface of the electrode. Alternatively, the edge length per unit working area may be measured by calculating the total edge length of the apertures formed between the back surface and the aperture walls and dividing this value by the area of the back surface of the electrode.

Thus, for example, an elongate aperture that is rectangular in shape with dimensions X and Y will have an edge length of $2X+2Y$. An electrode with a total of N such rectangular elongate apertures within a rectangular working area with dimensions A and B will have an edge length per unit working area of $(N\times(2X+2Y))\div(A\times B)$.

As described above, the aperture walls may be tapered through the thickness of the electrode. When the aperture walls are tapered, the edge length of an aperture measured between the front surface of the electrode and the aperture walls will be different to the edge length measured between the back surface of the electrode and the aperture walls.

An advantage of having an electrode with at least one aperture which is elongate is that such an aperture provides a greater aperture edge length per unit working area of the diamond plate than a circular aperture. As such, when an electrochemical apparatus of the present invention having an electrode comprising a diamond plate with at least one aperture is used in processing water, the increase in edge length per unit working area of the diamond plate increases the rate of ozone production per unit working area of the diamond plate.

A further advantage of having at least one elongate aperture in the electrode is that the lower average curvature of elongate apertures allows for a larger number of elongate apertures to be present in the electrode, thus increasing edge length per unit working area of the electrode, whilst retaining the minimum requirements for electrode strength. This is particularly important where the electrode is diamond.

In addition, the reduction in the percentage of curved edge length of elongate apertures compared to circular apertures and the concomitant increase in strength of the electrode allow for a smaller minimum aperture separation for elongate apertures in comparison to circular apertures. Therefore, an electrode comprising elongate apertures at their minimum separation can have a significantly greater aperture edge length per unit working area of the electrode than an electrode comprising circular apertures at their minimum separation.

An increase in the aperture edge length per unit working area of the electrode increases the rate of the electrochemical reaction per unit working area of the electrode, which occurs along the edge length. In the case of the electrolysis of water, the increased edge length per unit working area of the electrode increases the rate of ozone production per unit working area of the electrode.

Fewer elongate apertures are required to produce a certain edge length per unit working area of the electrode compared to circular apertures. An advantage of having fewer apertures is that the electrode is stronger. This is particularly advantageous where the electrode comprises diamond. This increase in strength allows for the use of thinner diamond plates in the manufacture of the electrodes and results in a reduction in the cost of the raw materials required.

When using elongate apertures, for a certain aperture edge length per unit working area of the electrode, the mean curvature per unit edge length is reduced relative to circular apertures. The increase in the mean curvature for circular apertures makes cutting a certain edge length of circular apertures more difficult than cutting the same edge length of elongate apertures. Therefore, an electrode comprising elongate apertures is easier to manufacture. Furthermore, the lower percentage of curved edge length will increase the strength of the electrode, particularly when the electrode comprises diamond, due to the reduction of stress concentration steps.

A further advantage of the use of elongate apertures is a lower manufacturing time per unit edge length cut compared to circular apertures. This is due to two factors, firstly the ease of cutting elongate apertures in comparison to circular apertures, due to the lower x-y table movement required, and secondly fewer elongate apertures are required to produce a certain edge length per unit working area. The smaller the number of apertures required, the lower the time that is wasted between finishing cutting one aperture and starting to cut the next.

Preferably, the elongate apertures are arranged in such a way that at least one of the edge lengths per unit working area of the electrode measured either with respect to the front surface or with respect to the back surface of the electrode, is greater than about 4 mm/mm$^2$, preferably about 4.5 mm/mm$^2$ or more, preferably about 5 mm/mm$^2$ or more, preferably about 5.5 mm/mm$^2$ or more, preferably about 6 mm/mm$^2$ or more, preferably about 6.5 mm/mm$^2$ or more, preferably about 7 mm/mm$^2$ or more, preferably about 8 mm/mm$^2$ or more, preferably about 9 mm/mm$^2$ or more, preferably about 10 mm/mm$^2$ or more.

As used herein, the area of the electrode refers to the working area of either the front surface or the back surface of the electrode to the cutting of the aperture(s). As used herein, the "working area" of the electrode is the area of the electrode into which the at least one aperture is cut. The aperture(s) may be cut into a small proportion of the entire area of the surface of the electrode; in this case this section is known as the working area. When the electrode is in the shape of a plate, then provided that the sides of the plate are not tapered, the area of the plate will be independent of whether it is measured using the front or back surface.

The elongate apertures may be arranged in such a way that the edge length per unit working area of the electrode is from about 4 mm/mm$^2$ to about 10 mm/mm$^2$, preferably from about 4.5 mm/mm$^2$ to about 9 mm/mm$^2$, preferably from about 5 mm/mm$^2$ to about 8 mm/mm$^2$, preferably from about 6 mm/mm$^2$ to about 7 mm/mm$^2$. Preferably the edge length per unit working area is about 4 mm/mm$^2$. Preferably the edge length per unit working area is about 6.5 mm/mm$^2$.

An elongate aperture preferably has a maximum width of less than about 0.5 mm. Preferably the maximum width is about 0.45 mm or less, about 0.4 mm or less, about 0.35 mm or less, about 0.3 mm or less, about 0.25 mm or less, about 0.2 mm or less, about 0.15 mm or less, about 0.1 mm or less. Preferably the maximum width is about 0.1 mm or greater and is less than about 0.5 mm, preferably from about 0.2 mm to about 0.4 mm, preferably from about 0.2 mm to about 0.3 mm, preferably the maximum width is about 0.2 mm.

The width of an elongate aperture may not be the same along the entire length of the elongate aperture, e.g. when the edges of the elongate aperture along which the edge length is measured are not parallel. In this case the maximum width is measured at the point at which the distance between the sides of the elongate aperture is greatest. Preferably, the edges of an elongate aperture are parallel and the width of the elongate aperture is the same along the entire length of the elongate aperture.

When an electrode comprises two or more elongate apertures, the maximum widths may be identical. Alternatively, at least one elongate aperture may have a maximum width that is different from that of an adjacent elongate aperture. Alternatively, all the elongate apertures may be of different maximum widths. Preferably, the maximum widths of the elongate apertures are identical, as such an embodiment is easier to manufacture.

An elongate aperture may adopt a variety of arrangements, e.g. a spiral arrangement. A spiral may be a log spiral or may have an equal distance between successive loops. A plurality of spiral arrangements may be present on a single electrode. When an electrode comprises two or more apertures, the apertures may be arranged such that they are parallel. Alternatively, the elongate apertures may be arranged in a variety of other ways such as a random arrangement, one or more circular arrangements, or one or more spoke formations.

It is preferable that each elongate aperture is parallel to an adjacent elongate aperture. A number of arrangements of elongate apertures can be envisaged, including parallel pairs of elongate apertures, and clusters of parallel elongate apertures. Each cluster may include the same or a different number of elongate apertures. It is preferable that there is more than one elongate aperture. Furthermore, preferably each of the elongate apertures has a longitudinal axis and the longitudinal axes of all elongate apertures are parallel.

Preferably, when the electrode comprises two or more elongate apertures, the maximum spacing between adjacent elongate apertures is about 0.6 mm or less, preferably about 0.5 mm or less, preferably about 0.3 mm or less, preferably about 0.2 mm or less, preferably about 0.1 mm or less. Preferably the maximum spacing between adjacent elongate apertures is from about 0.1 mm to about 0.6 mm, preferably from about 0.2 mm to about 0.5 mm, preferably from about 0.4 mm to about 0.3 mm, preferably the maximum spacing is about 0.3 mm. The spacing between adjacent elongate apertures may differ along their lengths. Preferably, the edges of adjacent elongate apertures are parallel and the spacing between adjacent elongate apertures is the same along the entire length.

When an electrode comprises two or more elongate apertures, the elongate aperture lengths may be identical. Alternatively, at least one elongate aperture may have an elongate aperture length that is different from that of an adjacent elongate aperture. Alternatively, all the elongate apertures may be of different lengths. Preferably, the elongate aperture lengths are identical, as this arrangement is easier to manufacture. For example, it would be time-consuming to programme the cutting machine to cut a number of apertures of differing lengths.

Where the electrode is in the form of a plate, the elongate apertures may be arranged with at least one elongate aperture parallel to a side of the plate. When more than one elongate aperture is arranged so as to be parallel to a side of the electrode plate, the apertures may be arranged in clusters of two or more apertures, each aperture being parallel to an adjacent aperture and also parallel to a side of the electrode plate.

Where the electrode is in the form of a plate which comprises at least two elongate apertures in each of two orthogonal directions, preferably the longitudinal axis of each elongate aperture is aligned with the longitudinal axis of each adjacent aperture(s) and each elongate aperture is positioned relative to an adjacent aperture such that the ends of the elongate apertures are co-terminal. Such an arrangement is advantageous as the presence of "bars" between adjacent elongate apertures means that the electrode has an improved structural integrity.

When the electrode comprises two or more elongate apertures, at least one elongate aperture can be arranged in a staggered position relative to an adjacent elongate aperture such that the ends of the elongate apertures are not adjacent.

In the electrochemical apparatus of the present invention, the electrode is preferably positioned immediately adjacent to the solid electrolyte.

When the electrochemical apparatus of the present invention comprises an electrode in the form of a plate having tapered elongate aperture walls, the solid electrolyte may be positioned immediately adjacent to the surface of the electrode having the greatest edge length per unit working area. This arrangement leads to a higher rate of electrochemical reaction, per unit working area of the electrode plate. A potential disadvantage of this arrangement is product inhibition at the triple phase interface of the electrode, solid electrolyte and the fluid to be processed, which is the site at which the electrochemical reaction takes place. Product inhibition of the electrochemical reaction may occur where products are trapped at the reaction site, for example, where the elongate aperture walls are tapered. However, in the electrochemical apparatus of the present invention this problem is overcome because the apparatus has means for forcing the fluid to be processed to flow through the apparatus, thereby taking with it products formed at the reaction site and overcoming the problem of reaction inhibition.

Alternatively, where the electrode is a plate having tapered elongate aperture walls, the solid electrolyte may be positioned immediately adjacent to the surface of the electrode with the smallest edge length per unit working area. However, this arrangement would lead to a lower rate of electrochemical reaction per unit working area of the electrode plate.

In the electrochemical apparatus of the present invention, a further electrode is preferably present immediately adjacent to the solid electrolyte. Preferably, the further electrode is separated from the electrode by the solid electrolyte. The further electrode may be made of any suitable material, and is preferably a platinum mesh electrode.

The electrochemical apparatus of the present invention is arranged such that the fluid to be processed undergoes forced flow through the apparatus, while at the same time allowing the fluid to be processed, the electrode and the solid electrolyte to form at least one three phase interface where an electrochemical reaction can occur. The electrochemical apparatus can be arranged in a variety of ways in order to achieve this.

For example, where the electrochemical apparatus of the present invention comprises an electrode having at least one aperture, the electrode is preferably partially covered with a cover such that two portions of the at least one aperture are uncovered and wherein one portion of the at least one aperture forms an inlet for the fluid to be processed and the other portion forms an outlet for the fluid to be processed. In this way, the electrochemical apparatus is thus arranged such that fluid to be processed is forced to flow into the aperture via the inlet. Once in the aperture, the fluid to be processed forms part of the three phase interface along with the electrode and the solid electrolyte and the electrochemical reaction can occur. The processed fluid then exits the aperture via the outlet. Preferably, the electrode and the cover are in the form of plates as this provides for easier manufacturing and easier assembly of the cover onto the electrode.

When more than one elongate aperture is present, the cover may be arranged so that the central portions of the elongate apertures are covered and the ends of the elongate apertures are uncovered. The cover can be made from any suitable material, preferably an electrical insulator e.g. a plastic or polymeric material such as polyvinylchloride (PVC), polypropylene (PP), polyethylene (PE), polytetrafluoroethane (PTFE). One end of an elongate aperture forms an inlet and the other end forms an outlet. Consequently, when more than one elongate aperture is present, there will be a plurality of inlets and outlets.

Advantageously, partially covering the electrode with a cover plate ensures that the fluid to be treated e.g. water is a minimum distance away from the working area of the electrode. In addition, the inclusion of a cover plate means that bubble formation in the elongate apertures is minimised thus maximising the efficiency of the system.

Where the electrode is in the form of a plate, a main channel may be cut in the electrode, where the main channel has a length which is longer than its width, two sides which run along the length of the main channel and two ends that run along the width. The main channel may be cut using any of the techniques described herein for cutting elongate apertures. The main channel may be straight-sided or curved and is preferably straight sided. The main channel is cut across at least one of the sides of the electrode such that if a cover plate were applied that substantially covered the entire front or back surface of the electrode, an inlet/outlet to the main channel is present on the side of the electrode. Preferably the main channel is cut across one of the sides of the electrode. The main channel may be present anywhere on the electrode and is preferably parallel to a side of the electrode.

In addition, at least one elongate aperture is present wherein one end of the aperture is in fluid contact with the main channel. The end of the aperture that is not in contact with the main channel is located at the side of the electrode such that if a cover plate were applied that substantially covered the entire front or back surface of the electrode, an inlet/outlet to the aperture is present on the side of the diamond plate. The aperture may be any aperture described herein and is preferably a straight-sided aperture. Preferably the aperture makes a 90° angle with the main channel. Preferably more than one aperture is present, in this case one end of each aperture is in fluid contact with the main channel and one end is located at the side of the electrode. Preferably the apertures are parallel to each other and each aperture makes a 90° angle with the main channel. All of the apertures are preferably the same length. Preferably, the maximum spacing between adjacent apertures is the same. Preferably the maximum width of each aperture is the same. The apertures may be connected to one or both of the sides of the main channel. The apertures are preferably connected to one side of the main channel, in this case the side of the main channel may be located substantially closer to one of the sides of the electrode. In this embodiment, substantially closer means a maximum separation between the side of the main channel and the side of the electrode of about 10 mm or less, preferably about 5 mm or less, preferably about 2 mm or less, preferably about 1 mm or less.

Where the electrode is in the form of a plate, preferably the entire front or back surface of the electrode is covered with a cover plate such that the inlet/outlet of the main channel and the inlet(s)/outlet(s) of the elongate aperture(s) are located at the sides of the electrode. Preferably a solid electrolyte may be present immediately adjacent to the surface of the electrode which is not covered with the cover plate. In this case the main channel and apertures are enclosed except for the end(s) which are located at the sides of the diamond plate. In this way, the fluid to be processed is forced to flow through the aperture inlet(s) and allowed to exit through the main channel outlet. Preferably, the fluid to be processed is pumped in through the main channel inlet and allowed to exit through the elongate aperture outlet(s). Preferably the apertures are arranged substantially parallel to the direction of the force of gravity and that the main channel is positioned at the bottom of the plate with apertures positions vertically upwards from the uppermost side of the main channel. In this case, the fluid to be processed is pumped through the main channel and vertically upwards through the apertures to the aperture outlets.

Where the electrode comprises a main channel, the edge length per unit working area of the electrode includes the edge length of the main channel. The edge length of the main channel is calculated as the edge length excluding the sections of edge length which have been removed by the aperture connections.

Preferably, at least one manifold may also be present to allow fluid flow to the inlet end(s) of the aperture(s) and away from the outlet end(s) of the aperture(s). Preferably, a single inlet manifold and a single outlet manifold are present. The inlet manifold comprises one or more fluid inlet apertures and the outlet manifold comprises one or more fluid outlet apertures. The inlet manifold covers the inlet end(s) of the aperture(s) while the outlet manifold covers the outlet end(s) of the aperture(s). The manifold(s) may be designed in any suitable way known in the art. In addition, the skilled person will appreciate that the cover plate and the manifold(s) could be made as a single component.

Where the electrode comprises a diamond plate, the surface of the diamond plate immediately adjacent to the cover plate may be processed subsequent to the growth of the plate, i.e. by lapping and optionally polishing to have a surface roughness, $R_a$, of less than about 1 μm. Alternatively, the surface of the diamond plate immediately adjacent to the cover plate may be present in the as-grown condition, i.e. the surface has not been treated subsequent to growth of the diamond plate. In general, the surface roughness, $R_a$, of an as-grown growth surface of a CVD polycrystalline diamond is typically about 10% of the as-grown thickness, and is typically 10 μm or more. In both the as-grown and processed aspects, it is preferable to provide a seal between the surface of the diamond plate and the cover plate, and between the surface of the diamond plate and the manifold(s) to prevent leakage of the fluid. This seal may be present around the periphery of the diamond plate. Clearly, a single component cover plate and manifold(s) will reduce the number of seals that are required.

Whilst it is advantageous that fluid to be processed only passes along the apertures from the inlet manifold to the outlet manifold, it is not essential that it does so provided that the pathway from the inlet manifold to the outlet manifold is the dominant pathway for the fluid flow. If there are a small number of gaps between the cover and/or manifold and the electrode, the apparatus will still perform satisfactorily.

Advantageously, the cover and/or manifold structure can form the main structural component of the apparatus, supporting the electrode. This is particularly advantageous where the electrode comprises a diamond plate as the diamond plate can then be made thinner, thereby reducing manufacturing cost.

An advantage of having an apparatus in a forced flow configuration is that the minimum size of the apertures can be made smaller than is possible with a non-forced flow configuration because the possibility of product inhibition in the aperture is avoided. In particular, bubble formation is avoided because the bubble nuclei will be swept out by the flow before a bubble has a chance to form. A decrease in the minimum size of the apertures whilst maintaining the minimum separation between adjacent apertures increases the edge length per unit working area of the electrode and hence the amount of reaction which can occur on a given area at the reaction site, that is, the three phase interface, is increased. When using an electrode in the form of a plate having tapered aperture walls, the reduction in bubble formation allows the surface of the electrode immediately adjacent to the solid electrolyte to be the surface with the greatest edge length per unit working area without significant inhibition of the electrochemical reaction, as discussed above.

In one embodiment, the apparatus of the present invention comprises an electrode which consists essentially of electrically conducting diamond, preferably comprising at least one aperture, which is preferably elongate; a solid electrolyte; and means for providing forced flow through the apparatus of a fluid to be processed, wherein the apparatus is arranged such that when the fluid to be processed is introduced into the apparatus, there exists at least one three phase interface between the electrode, the solid electrolyte and the fluid to be processed and such that the fluid forming part of the three phase interface undergoes forced flow through the apparatus at a flow rate of greater than about 0.1 cm$^3$ per second per cm$^2$ of passage cross section per cm of passage length, preferably greater than about 1 cm$^3$ per second per cm$^2$ of passage cross section per cm of passage length, preferably greater than about 10 cm$^3$ per second per cm$^2$ of passage cross section per cm of passage length, preferably greater than about 100 cm$^3$ per second per cm$^2$ of passage cross section per cm of passage length of the apparatus. In this embodiment, where the at least one aperture in the electrode is elongate, the apparatus is preferably arranged such that the fluid undergoes forced flow along greater than about 50%, preferably greater than about 75%, preferably greater than about 85%, preferably greater than about 90%, preferably greater than about 95%, preferably about 100% of the length of the elongate interface.

Advantageously, in this embodiment, the applied pressure above atmospheric pressure at the point of entry of the fluid into the apparatus is greater than about 0.1 bar, preferably greater than about 0.2 bar, preferably greater than about 0.5 bar, preferably greater than about 0.8 bar, preferably greater than about 1 bar, preferably greater than about 5 bar, preferably greater than about 10 bar.

Further, alternatively or in addition to the applied pressure being as defined above, the pressure drop between the point of entry of the fluid into the apparatus and the point of exit of the fluid from the apparatus in this embodiment may be less than about 10 bar, preferably less than about 8 bar, preferably less than about 5 bar, preferably less than about 3 bar, preferably less than about 1 bar, preferably less than about 0.8 bar, preferably less than about 0.5 bar, preferably less than about 0.2 bar.

The electrochemical apparatus of the present invention preferably further comprises a counter reaction fluid. The counter reaction fluid is preferably in contact with the further electrode, which is preferably a cathode. The counter reaction fluid is preferably an electrically conducting fluid having a resistivity of less than about 10$^7$ Ωcm. Examples of counter fluids are deionised water, tap water and deionised water containing salt (NACl) at a concentration of 10 g/dm$^3$.

The apparatus is arranged such that the counter reaction fluid is isolated from the fluid to be processed. In this way, the counter reaction fluid provides a medium in which the counter reaction to the reaction taking place at the three phase interface may occur. The counter reaction fluid is preferably isolated from the fluid to be processed, at least in part, by the solid electrolyte.

Preferably, the apparatus further comprises means for providing forced flow of the counter reaction fluid through the apparatus. In this way, reaction products formed at the further electrode may be swept through the apparatus by the counter reaction fluid, thereby avoiding potential problems of inhibition of the reaction. The apparatus may be arranged such that the counter reaction fluid flows in a direction which is aligned substantially with the direction of flow of the fluid to be processed.

Preferably, the solid electrolyte may be substantially in the shape of a tube. Such an arrangement provides an alternative way in which to isolate the fluid to be processed from a counter reaction fluid. For example, the fluid to be processed may be forced to flow through the middle of the tube while a counter reaction fluid exists around the outside of the tube. Alternatively, the fluid to be processed may be forced to flow around the outside of the tube while a counter reaction fluid exists in the middle of the tube.

The solid electrolyte tube may have a cross-section of any suitable shape, such as a square, rectangle, circle, ellipse, pentagon, hexagon and so on. Preferably, the tube has a circular cross-section. The solid electrolyte tube may have a substantially uniform cross-section along its length. Alternatively, the solid electrolyte tube may have a cross-section that varies in size and/or shape along its length.

Where the solid electrolyte is substantially in the shape of a tube, the electrode may be positioned on an outside surface of the tube. Preferably, there may be a plurality of the electrodes positioned on the outside surface of the solid electrolyte tube. Preferably, there are 1 or more, 2 or more, 3 or more, about 5 or more, about 10 or more, about 20 or more, about 30 or more, about 50 or more, about 75 or more, about 100 or more electrodes positioned around the outside surface of the solid electrolyte tube. Each electrode is preferably at the same potential as the other electrodes positioned on the outside surface of the solid electrolyte tube. A further electrode, functioning as a counter electrode, may be positioned within the solid electrolyte tube.

In the apparatus of the present invention, the fluid to be processed is preferably an electrically conducting fluid having a resistivity of less than about 10$^7$ Ωcm. The fluid to be processed is preferably a liquid, preferably an aqueous liquid.

Preferably, the fluid to be processed is water. Typically, the water to be processed is contaminated in some way. For example, the water to be processed may come from household waste, a swimming pool, a medical facility, sewerage works or an industrial plant. The electrochemical apparatus of the present invention thus enables such water to be processed by producing ozone by electrolysis of the water. The ozone is able to sterilize, decolourize and/or deodorize the water to make it suitable for human consumption. By "suitable for human consumption" is meant herein that it is suitable for use by humans. Use by humans may include drinking, washing, bathing and so on.

A further advantage of the apparatus of the present invention in the case of the electrolysis of water, is that the means for providing forced flow of the fluid to be processed ensures that the water being ozonised passes as close as possible to the reaction site (the three phase interface). This is important since ozone has only a short lifetime in water.

In a second aspect of the present invention, there is provided a method of production of ozone by the electrolysis of water using an apparatus of the present invention in which the fluid to be processed is water.

Advantageously, where the apparatus of the present invention is used in the electrolysis of water, the rate of ozone production is at least about 0.03, about 0.05, about 0.10, about 0.15, about 0.20, about 0.25, about 0.30 mg/min/mm$^2$ of working area of the electrode.

Preferably, the water is processed in the method of the present invention in order that it is suitable for human consumption.

A further advantage of the apparatus of the present invention is that it is not limited to being used with mains electricity as a power source and may alternatively be used in combination with a power source which utilises renewable energy sources such as, for example, solar power or wind. The apparatus of the present invention thus lends itself to the treatment of water in developing countries where access to mains electricity is problematic. Alternatively other portable power sources such as batteries and portable electricity generators might also be used in combination with the apparatus of the present invention.

When an apparatus of the present invention is used a three-phase interface is formed between the electrode, the solid electrolyte and the fluid to be processed. This is the reaction site, i.e. the site of the electrochemical reaction. When the electrode comprises diamond biased as the anode and the apparatus further comprises a further electrode biased as the cathode, electrolysis of the fluid to be processed at the reaction site occurs. Any ions produced during electrolysis are removed from the reaction site through the solid electrolyte to react at the further electrode (the cathode). When the fluid to be processed is water, ozone is produced at the reaction site and hydrogen ions are removed from the reaction site through the solid electrolyte (which in this case is a PEM) to react with electrons at the cathode and produce hydrogen gas which is evolved.

After reaction at the cathode, the flow of fluid from the cathode region of the apparatus may be fed back through to the anode region of the apparatus for output as drinking water suitable for human consumption. Advantageously, where this is the case, the apparatus of the present invention can be used in conjunction with a single standard supply.

At least two of the apparatuses of the present invention may be arranged in an array wherein each apparatus is positioned adjacent and parallel to at least one further apparatus. The apparatuses are positioned in opposing orientation, i.e. the electrode of one apparatus facing the electrode of the neighbouring device. When arranged in an electrochemical cell, the electrode of each device is biased as the anode and the apparatuses each comprise a further electrode biased as the cathode. The fluid to be processed flows adjacent, and between, two adjacent anodes. Similar adjacent elements from neighbouring electrochemical cells may be replaced by a single element used by both electrochemical cells. For example, both sides of a single electrode may be used in adjacent electrochemical cells. Likewise, both sides of a platinum mesh electrode may be used as the further electrode in adjacent electrochemical cells. An advantage of this arrangement is a reduction in the cost of materials.

Specific embodiments of the present invention will now be described by way of example with reference to the following figures in which:

FIG. 3(*b*) shows the embodiment of FIG. 3(*a*) including a cover plate;

FIG. 9(*b*) shows a cross-section through the elongate aperture of FIG. 9(*a*);

Figure 12:
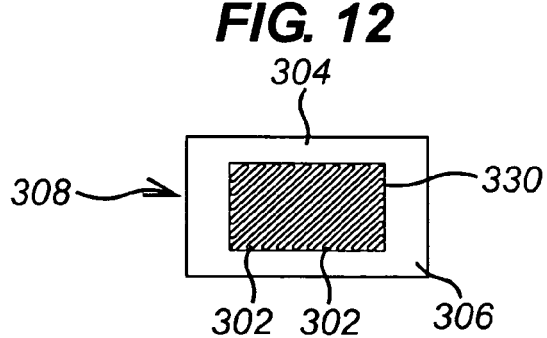
Figure 14A:
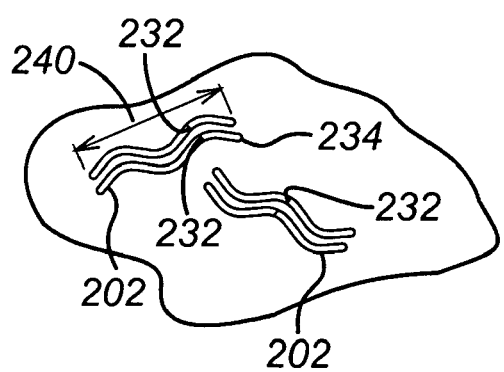
Figure 14B:
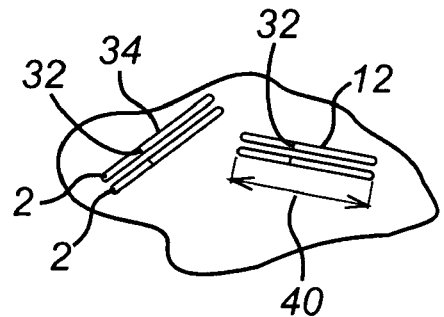
Figure 14C:
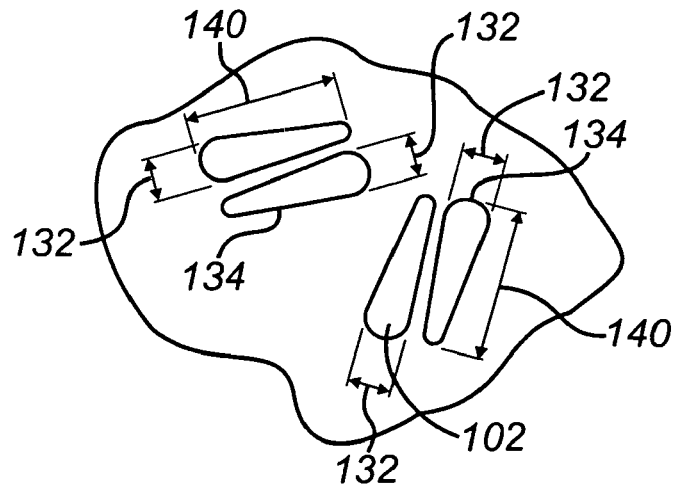
Figure 14D:
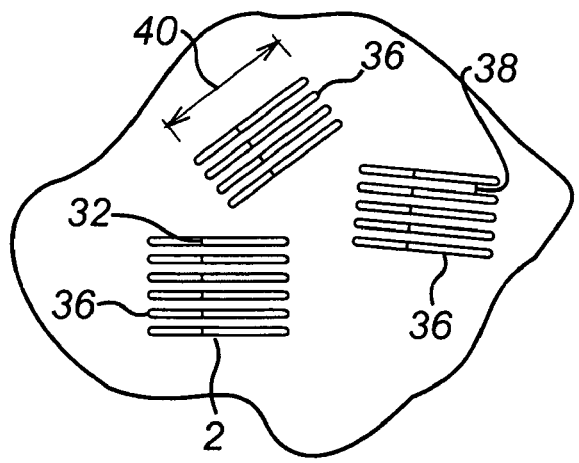
Figure 14E:
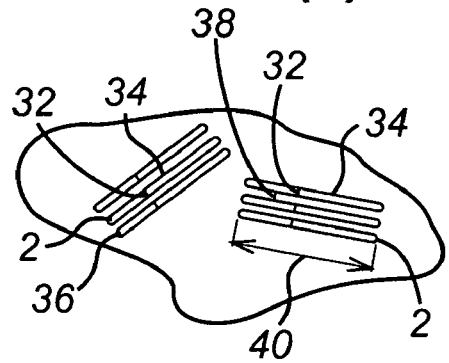
Figure 14F:
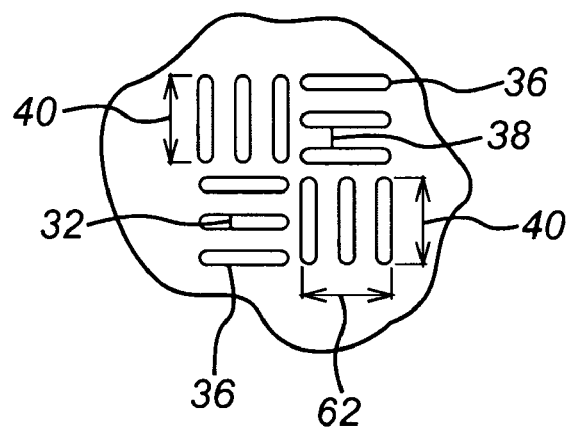
Figure 14G:
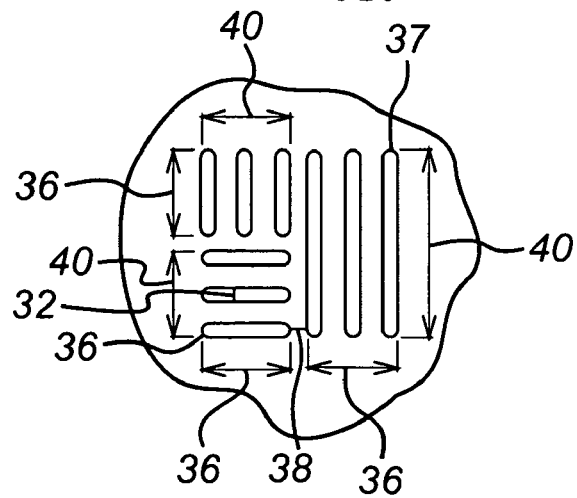
Figure 14H:
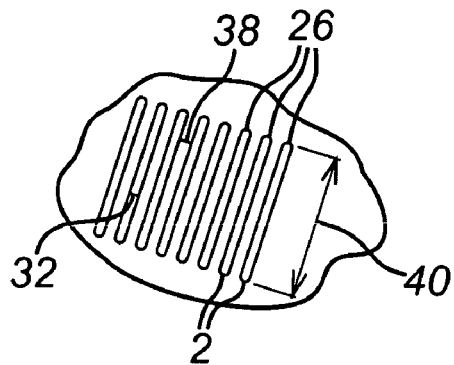
Figure 14I:
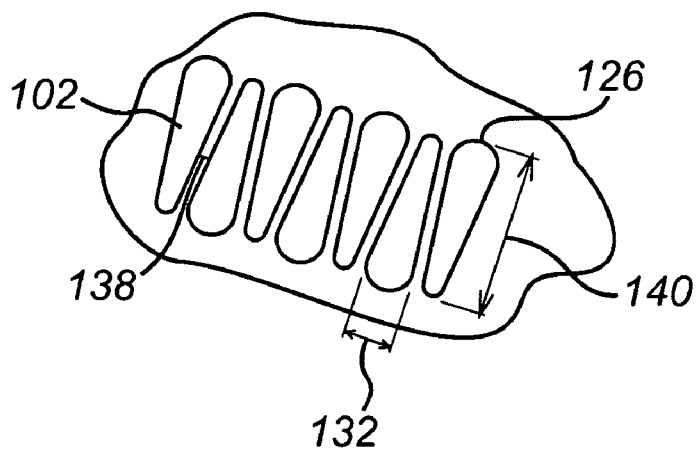
Figure 15:
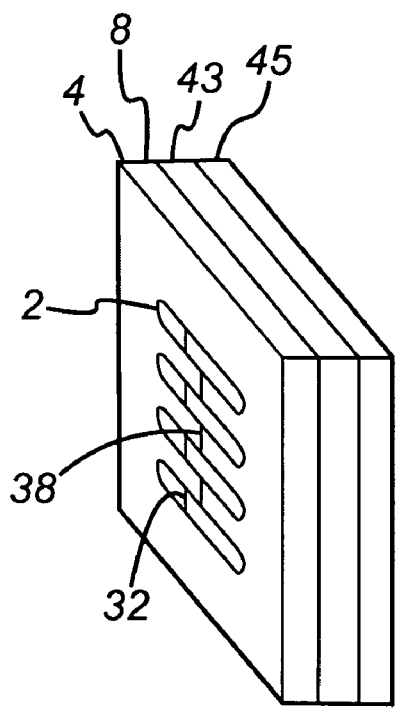

FIGS. 10(*a*)-(*b*) show examples of straight-sided elongate apertures;

FIG. 11(*a*)-(*c*) shows an example of a bent-sided aperture;

FIG. 12 shows the working area of a diamond plate;

FIGS. 13(*a*) and (*b*) show examples of arrangements of non-parallel elongate apertures;

FIGS. 14(*a*)-(*i*) show examples of arrangements of parallel elongate apertures; and FIG. 15 shows a diamond plate/PEM/further electrode device.

Figure 1:
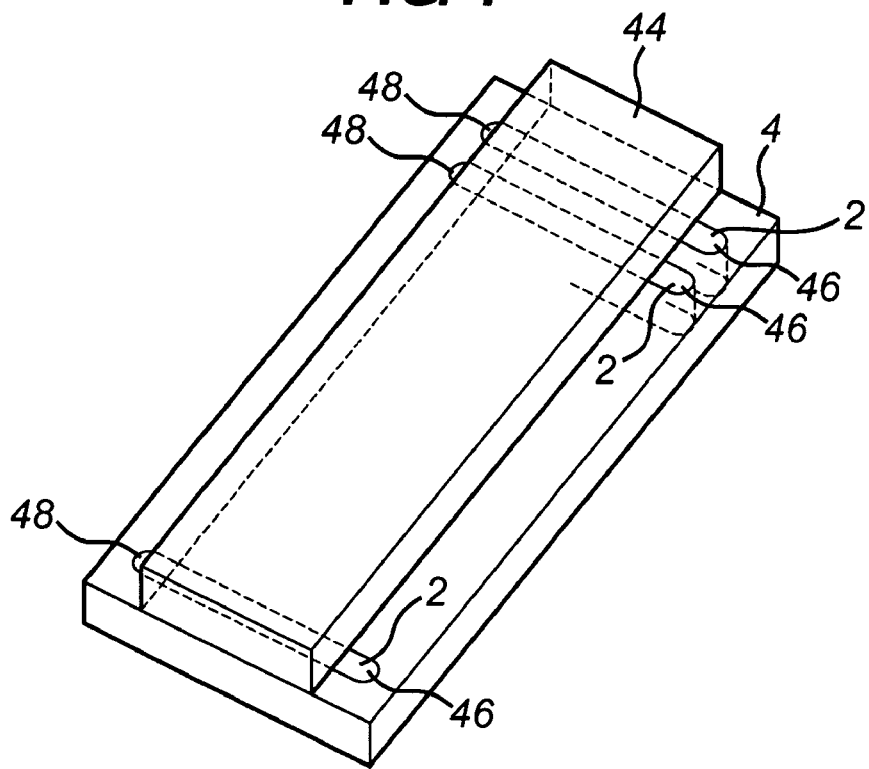
FIG. 1 shows an apparatus of the present invention comprising a diamond plate with a cover plate.

FIG. 1 shows the partial construction of an apparatus of the present invention having a forced flow configuration. In this embodiment, the electrode comprises an electrode (4) having a plurality of elongate apertures (2). The electrode (4) is partially covered with a cover plate (44) such that the central portions of the elongate apertures (2) are covered and the ends of the elongate apertures (2) are uncovered. In this embodiment, one end of an elongate aperture (2) forms an inlet (46) and the other end forms an outlet (48). Consequently, in the embodiment of FIG. 1 there are a plurality of inlets (46) and outlets (48). The apparatus has a means (not shown) for providing forced flow of a fluid to be processed (not shown) into the inlets (46) such that the fluid to be processed is forced into the elongate apertures (2) to form a three phase interface with the electrode (4) and a solid electrolyte (not shown) and hence undergo an electrochemical reaction.

Figure 2:
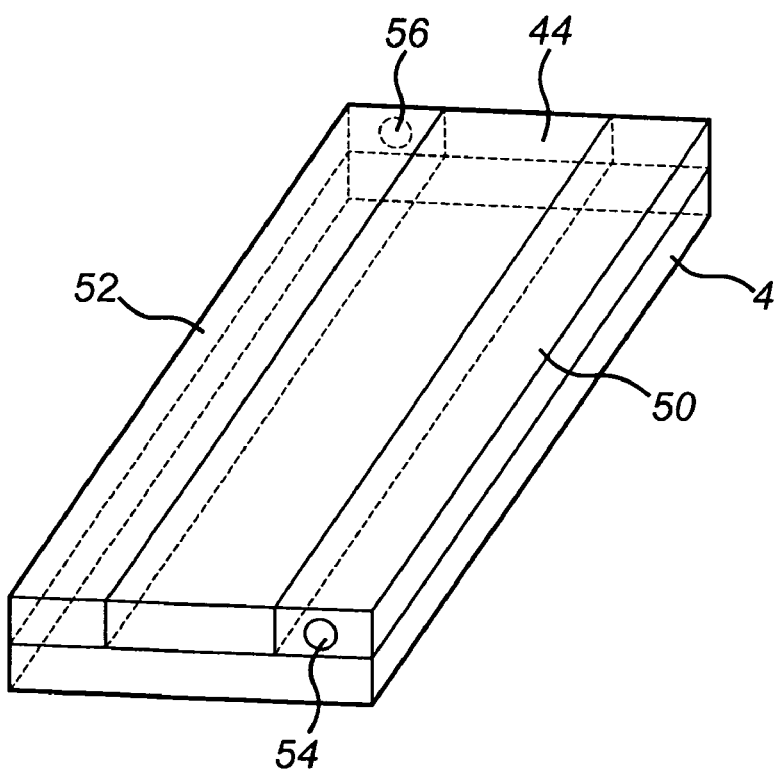
FIG. 2 shows an apparatus of the present invention comprising a diamond plate with a cover plate and a manifold plate.

FIG. 2 shows the embodiment of FIG. 1 including an inlet manifold (50) and an outlet manifold (52). The inlet manifold (50) comprises a fluid inlet aperture (54) and the outlet manifold (52) comprises a fluid outlet aperture (56). The inlet manifold (50) covers the inlet end(s) (46) of the elongate aperture(s) (2) while the outlet manifold (52) covers the outlet end(s) (48) of the elongate aperture(s) (2).

FIG. 3(*a*) shows a further embodiment of the apparatus of the present invention. In this embodiment, a straight-sided main channel (301) is present in a rectangular, or plate, electrode (4) closest to one side (303) of the electrode. One end (305) of the main channel (301) is cut across one side (307) of the electrode. Eight elongate apertures (2) are present in this embodiment. One end (309) of each aperture is in fluid contact with the main channel (301). The end (311) of each aperture that is not in contact with the main channel (301) is located at the side (317) of the electrode (4).

The apertures (2) of this embodiment are straight sided, the same length (40), parallel to each other and make a 90° angle with the main channel (301). The maximum spacing (38) between adjacent apertures is the same. The maximum width (32) of each aperture is the same.

Figure 3A:
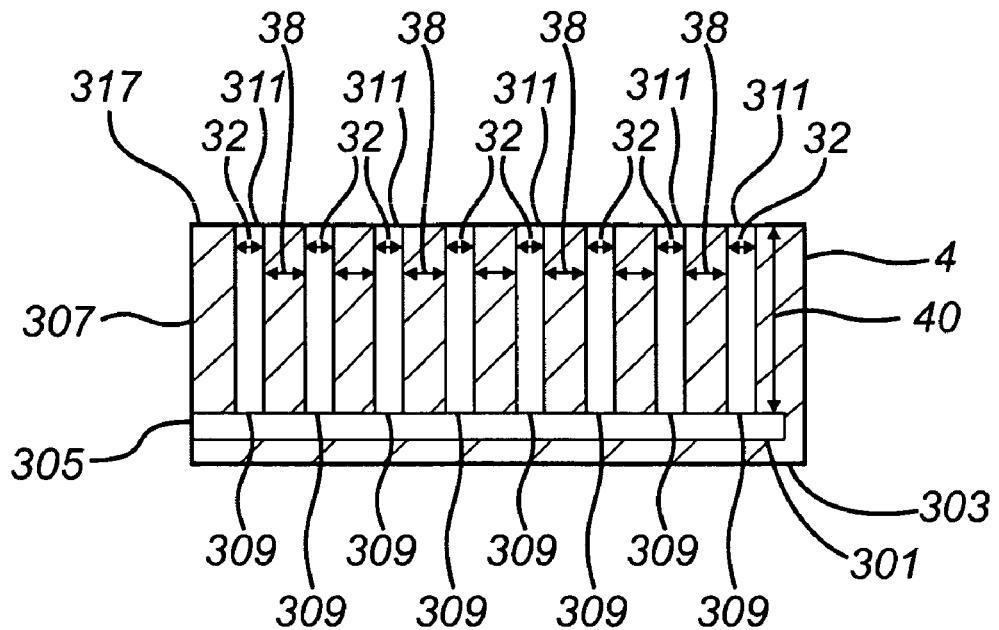
FIG. 3(*a*) shows an arrangement of elongate apertures with a main channel.
Figure 3B:
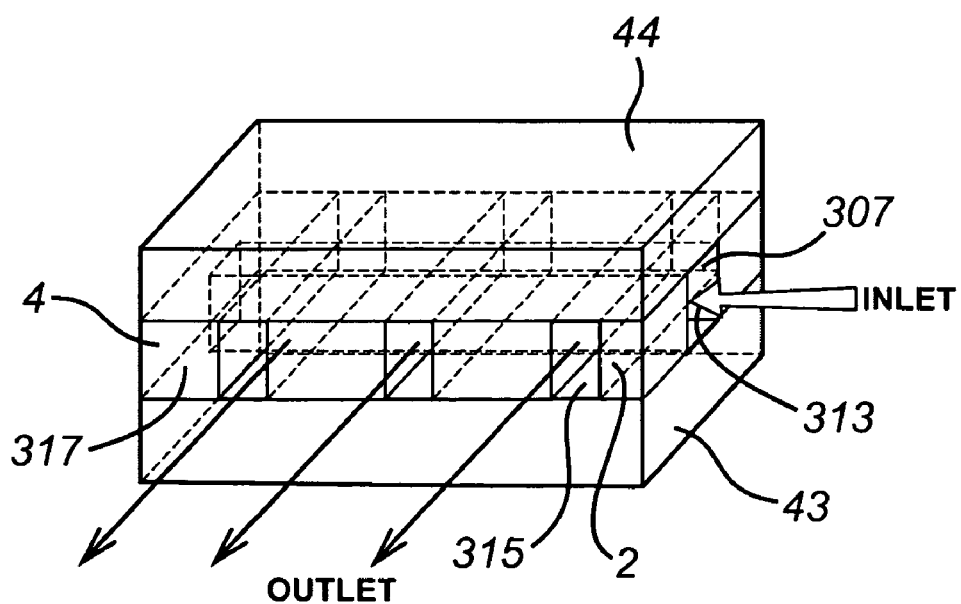

FIG. 3(b) shows the embodiment of FIG. 3(a) with a cover plate (44) positioned such that the inlet (313) of the main channel (301) and the outlets (315) of the elongate apertures (2) are present at two of the sides (307, 317) of the electrode (4). The cover plate (44) substantially covers the surface of the electrode (4).

In addition, a solid electrolyte (43) is present immediately adjacent to the surface of the electrode (4) which is not covered with the cover plate (44). The solid electrolyte (43) substantially covers the surface of the electrode (4). In the forced flow configuration of this embodiment, a fluid to be processed is pumped in through the main channel inlet and allowed to exit through the elongate aperture outlet(s), as shown in FIG. 3(b).

Figure 4:
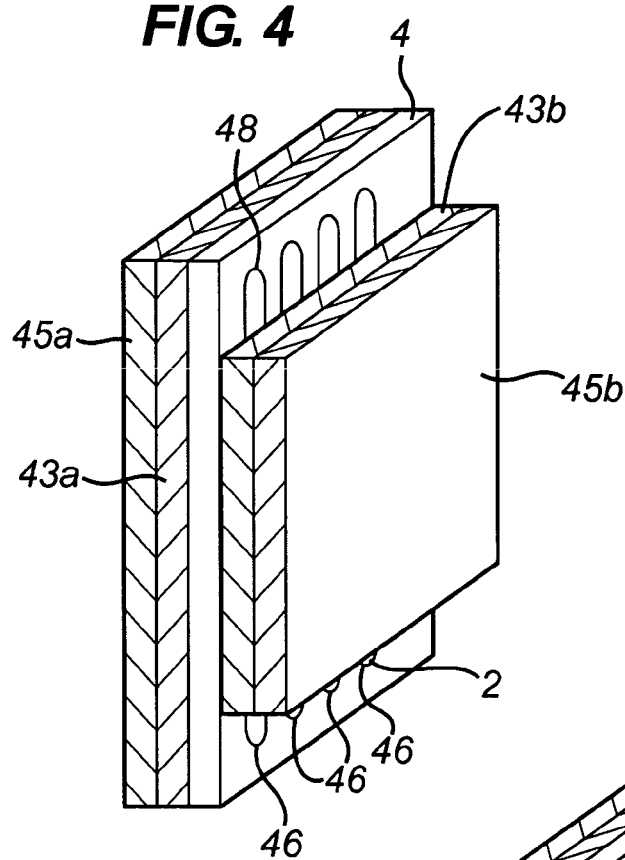
FIG. 4 shows an array of two apparatuses of the present invention positioned in opposing orientations and sharing a diamond plate electrode.

FIG. 4 shows an array of two apparatuses of the present invention positioned in opposing orientations and having a common a diamond plate electrode (4). The diamond plate electrode (4) has four elongate apertures (2). One side of the diamond plate electrode (4) is positioned next to a first PEM (43a), which is positioned adjacent a first cathode (45a). Thus, the first apparatus comprises the first cathode (45a), the first PEM (43a) and the diamond plate electrode (4).

The diamond plate electrode (4) further has a second PEM (43b) positioned on the side opposite the first PEM (43a). The second PEM (43b) is smaller than the size of the diamond plate electrode (4) such that it covers the central portions of the apertures (2) in the diamond plate electrode (4). In this way, each aperture (2) has one end uncovered which forms an inlet (46) and a second end uncovered which forms an outlet (48). The second PEM (43b) has a second cathode (45b) positioned adjacent to the side of the second PEM (43b) opposite the diamond plate electrode (4). Thus the second apparatus comprises the second cathode (45b), the second PEM (43b) and the diamond plate electrode (4).

The array of apparatuses has a means (not shown) for providing forced flow of water to be processed (not shown) into the inlets (46) such that the water to be processed is forced into the elongate apertures (2) to form three phase interfaces with the diamond plate electrode (4) and the first and second PEMs (43a, 43b). In this arrangement, there are three phase interfaces (not shown) on each side of the apertures (2), where the diamond plate electrode (4) meets each of the first and second PEMs (43a, 43b). In this way, the rate of processing of the water is increased compared to processing of water in a single apparatus.

Figure 5:
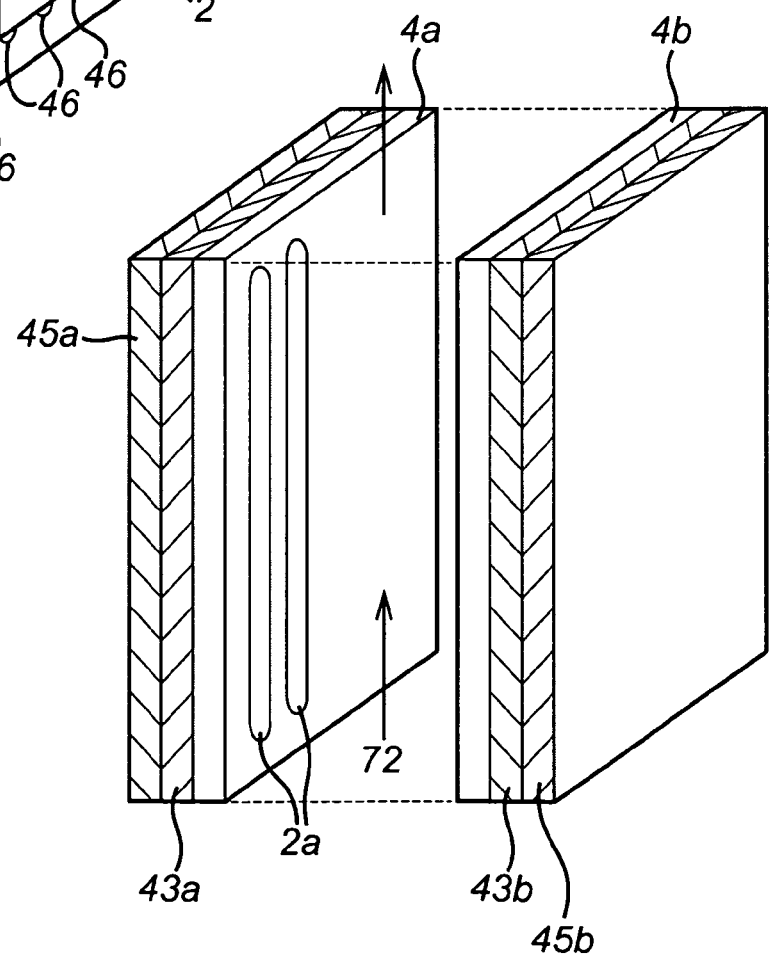
FIG. 5 shows an array of two apparatuses of the present invention.

FIG. 5 shows an array of two apparatuses of the present invention which are separated from each other but which are in opposing orientations. There is a first apparatus that has a first diamond plate electrode (4a) having a plurality of elongate apertures (2a). One side of the first diamond plate electrode (4a) is positioned next to a first PEM (43a), which is positioned adjacent a first cathode (45a).

Separated from the first apparatus is a second diamond plate electrode (4b) having a plurality of elongate apertures (not shown). One side of the second diamond plate electrode (4b) is positioned next to a second PEM (43b). The second PEM (43b) has a second cathode (45b) positioned adjacent to the side of the second PEM (43b) opposite the second diamond plate electrode (4b). Thus the second apparatus is positioned in an opposite orientation to the first apparatus.

The array of apparatuses has means (not shown) for providing forced flow of water to be processed (72) between the first and second apparatuses. The water to be processed (72) is forced to flow into the elongate apertures (not shown) to form three phase interfaces with the first diamond plate electrode (4a) and first PEM (43a) and with the second diamond plate electrode (4b) and the second PEM (43b). In this arrangement, there are three phase interfaces (not shown) within each aperture (2a) in each of the first and second diamond plate electrodes (4a, 4b) where the diamond plate electrodes meet each of the first and second PEMs (43a, 43b). In this way, the rate of processing of the water is increased compared to processing of water in a single apparatus.

Figure 6:
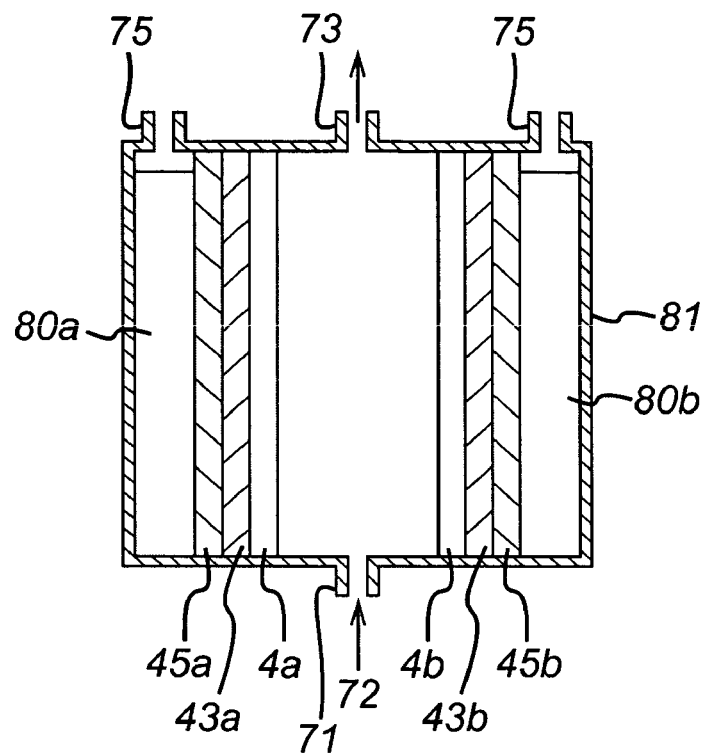
FIG. 6 shows an alternative array of two apparatuses of the present invention.

FIG. 6 shows an alternative array of two apparatuses of the present invention which are separated from each other but which are in opposing orientations. There is a first apparatus that has a first diamond plate electrode (4a) having a plurality of elongate apertures (not shown). One side of the first diamond plate electrode (4a) is positioned next to a first PEM (43a), which is positioned adjacent a first cathode (45a).

Separated from the first apparatus is a second diamond plate electrode (4b) having a plurality of elongate apertures (not shown). One side of the second diamond plate electrode (4b) is positioned next to a second PEM (43b). The second PEM (43b) has a second cathode (45b) positioned adjacent to the side of the second PEM (43b) opposite the second diamond plate electrode (4b). Thus the second apparatus is positioned in an opposite orientation to the first apparatus.

The first and second apparatuses are contained within a reactor (81). The reactor has an inlet (71) for admitting water to be processed (72) and an outlet (73) for allowing the processed water to exit.

The first and second apparatuses are arranged within the reactor so that water to be processed (72) is forced to flow in the region between the first and second diamond plate electrodes (4a, 4b) by pumping means (not shown). The water to be processed (72) is forced to flow into the elongate apertures (not shown) to form three phase interfaces with the first diamond plate electrode (4a) and first PEM (43a) and with the second diamond plate electrode (4b) and the second PEM (43b). In this arrangement, there are three phase interfaces (not shown) within each aperture (2a) in each of the first and second diamond plate electrodes (4a, 4b) where the diamond plate electrodes meet each of the first and second PEMs (43a, 43b). In this way, the rate of processing of the water is increased compared to processing of water in a single apparatus.

Water (80a, 80b) in which the counter reaction can occur is contained in the reactor adjacent to each of the first and second cathodes (45a, 45b). The water (80a, 80b) in which the counter reaction can occur is isolated from the water to be processed. The reactor has vents (75) which allow for release of hydrogen gas formed in the counter reaction water (80a, 80b) during the electrochemical reaction.

Figure 7:
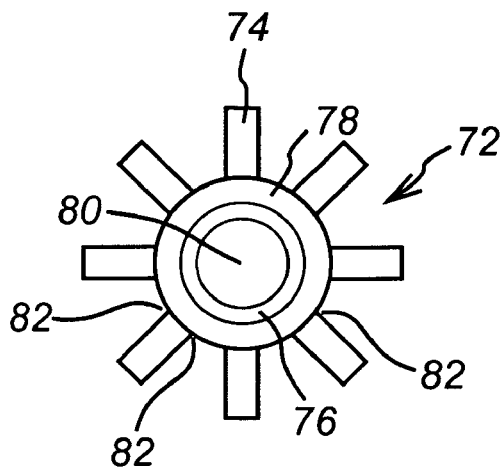
FIG. 7 shows a cross-sectional view of a further embodiment of the apparatus of the present invention.

FIG. 7 shows a cross-sectional view of an apparatus of the present invention. A solid electrolyte tube (78) having a substantially circular cross-section has positioned around its outside surface eight substantially rectangular 'fin-like' electrodes (74) each having a substantially rectangular cross-section and each being biased as an anode. The inside of the solid electrolyte tube (78) is lined with a further electrode (76)

biased as a cathode. A fluid to be processed (72) is forced to flow by a pumping means (not shown) along the exterior of the solid electrolyte tube (78), between and around the anodes (74). A plurality of three phase interfaces (82) are formed at the junction of each anode (74) with the solid electrolyte tube (78) and the fluid to be processed (72). Inside the solid electrolyte tube (78) lined with the cathode (76), a counter reaction fluid (80) is pumped by additional pumping means (not shown).

Figure 8:
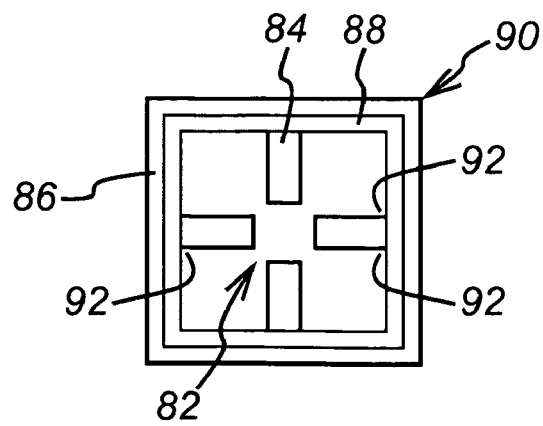
FIG. 8 shows a cross-sectional view of a further embodiment of the apparatus of the present invention.

FIG. 8 shows a cross-sectional view of an apparatus of the present invention. A solid electrolyte tube (88) having a substantially square cross-section has positioned on its interior surface four substantially rectangular 'fin-like' electrodes (84) each having a substantially rectangular cross-section and each being biased as an anode. The outside surface of the solid electrolyte tube (88) is coated with a further electrode (86) biased as a cathode. A fluid to be processed (82) is forced to flow by a pumping means (not shown) along the interior of the solid electrolyte tube (88), between and around the anodes (84). A plurality of three phase interfaces (92) are formed at the junction of each anode (84) with the solid electrolyte tube (88) and the fluid to be processed (82). Outside the solid electrolyte tube (88) coated with the cathode (86), a counter reaction fluid (90) is pumped by additional pumping means (not shown).

Figure 9A:
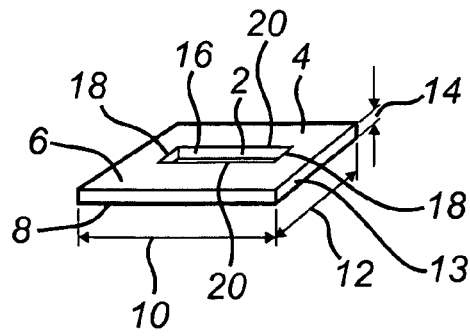
FIG. 9(*a*) shows an elongate aperture cut into a diamond plate.

FIG. 9(a) shows an example of an elongate aperture (2) cut into a diamond plate (4), which may be comprised in the electrode of the apparatus of the present invention. The diamond plate (4) may be of any shape having a front surface (6) and a back surface (8), sides (13) and a depth or thickness (14). In the embodiment shown in FIG. 9, the diamond plate is rectangular having a length (10) and a width (12). The elongate aperture (2) is cut through the entire thickness (14) of the diamond plate (4) and consequently extends from the front surface (6) of the diamond plate (4) to the back surface (8). The exposed diamond surfaces inside an elongate aperture (2), which have been exposed by the presence of the elongate aperture (2), are the elongate aperture walls (16). The elongate aperture (2) can be cut into the diamond plate (4) by any suitable technique known in the art including laser techniques, plasma etching, spark erosion, electro-discharge machining and ion beam milling. The edge length of the elongate aperture (2) is its perimeter which is the sum of the two longer edges (20) and the two shorter edges (18). The aspect ratio of the elongate aperture (2) is the length of the edge of the aperture (20) divided by the length of the edge of the aperture (18).

Figure 9B:
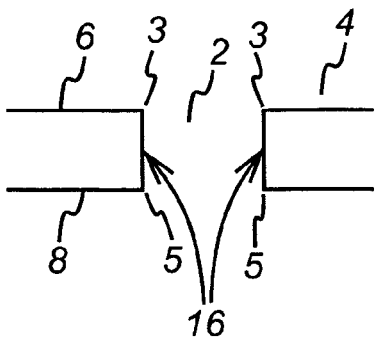

FIG. 9(b) shows a cross-section through the elongate aperture of FIG. 9(a). The elongate aperture (2) is formed in the diamond plate (4). There is an edge (3) at the intersection between the front surface (6) of the electrode and the elongate aperture walls (16) and a similar edge (5) at the intersection between the back surface (8) of the electrode and the elongate aperture walls (16).

Figure 10A:
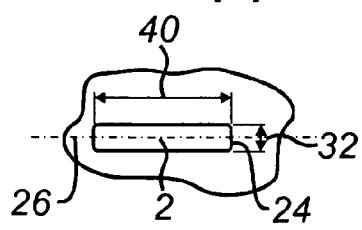
Figure 10B:
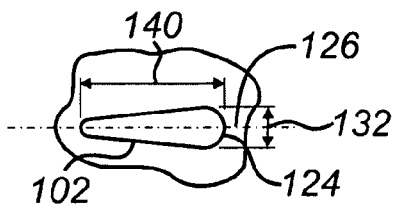

FIGS. 10(a) and 10(b) show examples of straight-sided elongate apertures (2) that may be formed in the electrode of the apparatus of the present invention. In the embodiment shown in FIG. 10(a) the elongate aperture has parallel sides and has a maximum length (40). Since the sides of the elongate aperture (2) are parallel, the width (32) of the elongate aperture is the same along its entire length. The ends (24) of the elongate aperture are curved. In the embodiment shown in FIG. 10(b), the elongate aperture (102) is drop shaped. In this embodiment, the sides of the elongate aperture (102) are not parallel and the maximum length of the elongate aperture is shown by arrow 140.

Since the sides of the elongate aperture (102) are not parallel, the maximum width of the elongate aperture (102) of this embodiment is shown by arrow (132). The ends (124) of the elongate aperture of this embodiment are curved. Elongate apertures (2, 102) of the embodiments shown in FIGS. 10(a) and 10(b) have a longitudinal axis (26).

Figure 11A:
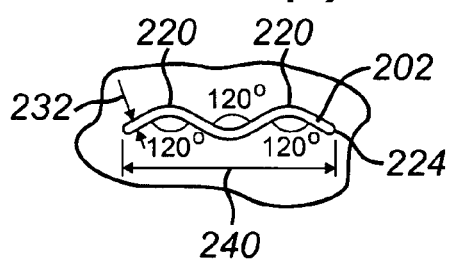
Figure 11B:
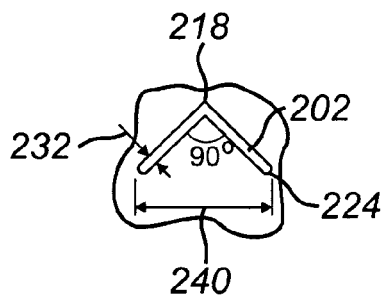
Figure 11C:
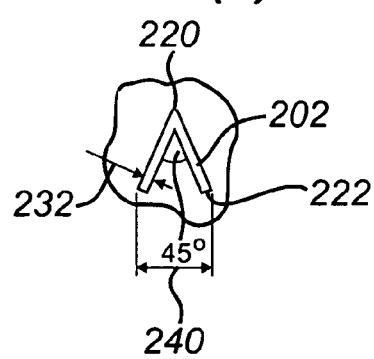

FIGS. 11(a)-(c) show examples of curved elongate apertures that may be formed in the electrode of the apparatus of the present invention. FIG. 11(a) shows an embodiment with three curves (220) along the length of the elongate aperture with the length of the elongate aperture (202) shown by arrow 240 and the width shown by arrow 232. The width (232) of the elongate aperture (202) of this embodiment is the same along the entire length (240) of the elongate aperture (202). The curves (220) of this embodiment have a smooth radius of curvature. The curves (220) of this embodiment curve through an angle of 120°. The ends (224) of the elongate aperture (202) of this embodiment are curved.

FIG. 11(b) shows an embodiment with a single curve (218). The width (232) of the elongate aperture (202) of this embodiment is the same along the entire length (240) of the elongate aperture (202). The curve (218) of this embodiment has a sharp corner. The curve (218) of this embodiment curves through an angle of 90°. The ends (224) of the elongate aperture (202) of this embodiment are curved.

FIG. 11(c) shows an embodiment with a single curve (220). The width (232) of the elongate aperture (202) of this embodiment is the same along the entire length (240) of the elongate aperture (202). The curve (220) of this embodiment has a smooth radius of curvature. The curve (220) of this embodiment curves through an angle of 45°. The ends (222) of the elongate aperture (202) of this embodiment are straight.

While the length of the elongate aperture is illustrated by arrow 240 in FIGS. 11(a), 11(b) and 11(c), as the skilled person will appreciate, the total edge length of the elongate aperture is the total perimeter of the curved elongate aperture.

FIG. 12 shows an embodiment wherein a central working area (330) is cut into a diamond plate (304). The diamond plate may be comprised in the electrode of the apparatus of the present invention. Parallel elongate apertures (302) are cut into the working area of the diamond plate (304). When measuring the aperture edge length per unit working area of the diamond plate in this embodiment, the working area (330) of either the front surface (306) or the back surface (308) of the diamond plate (304) is calculated prior to cutting the elongate apertures (302). Then, the total elongate aperture edge length is calculated for the elongate apertures (302) cut into the working area with reference to either the front surface (306) or the back surface (308) of the diamond plate (304). The aperture edge length per unit working area of the diamond plate can then be found by dividing the total elongate aperture edge length present with respect to the front surface (306) by the working area measured on the front surface (306). Alternatively, the edge length per unit working area may be found by dividing the total edge length of the elongate apertures (302) present with reference to the back surface (308) by the working area measured on the back surface (308).

Figure 13A:
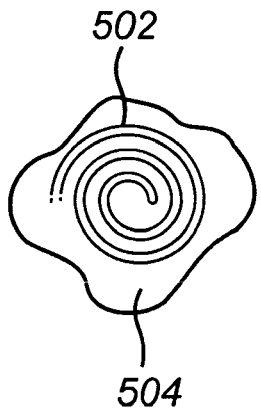

FIG. 13(a) shows an embodiment wherein a single elongate aperture (502) is arranged in a spiral arrangement on a diamond plate (504). The diamond plate may be comprised in the electrode of the apparatus of the present invention. This embodiment shows a spiral with an equi distance between successive loops.

Figure 13B:
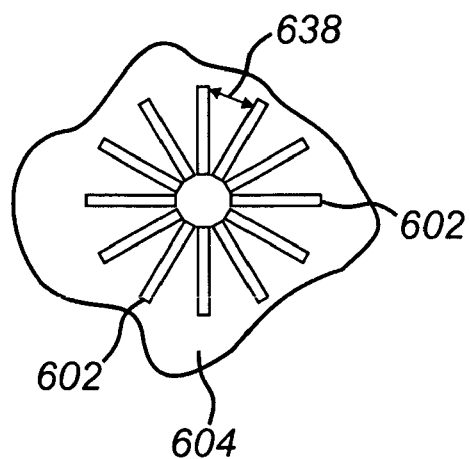

FIG. 13(b) shows an embodiment wherein the diamond plate (604) comprises two or more apertures (602), and the apertures are arranged in a spoke formation. The spoke formation of this embodiment comprises 12 spokes arranged with a maximum distance (638) between adjacent spokes.

FIGS. 14(a)-(c) show arrangements of elongate apertures (202) in parallel pairs (234), which may be used in the electrode of the apparatus of the present invention. In the embodiment shown in FIG. 14(a) the elongate apertures (202) are curved. The width (232) of the elongate apertures (202) of this embodiment is the same along the entire length (240) of each elongate aperture (202). In addition, the widths (232) of all the elongate apertures (202) are the same.

In the embodiment shown in FIG. 14(b) the elongate apertures (2) are straight-sided and have parallel sides. The width (32) of the elongate apertures (2) of this embodiment is the same along the entire length (40) of each elongate aperture (2). In addition, the widths (32) of all the elongate apertures (2) are the same.

In the embodiment shown in FIG. 14(c) the elongate apertures (102) are straight-sided and have non-parallel sides. Arrows labelled 132 show the maximum width of the elongate apertures of this embodiment. The widths (132) of the elongate apertures of this embodiment are different along the length (140) of the elongate apertures (102). In addition, the maximum widths (132) of all the elongate apertures (102) are the same.

FIGS. 14(d)-(g) show arrangements of elongate apertures (2) in clusters (36) of parallel elongate apertures (2). In the embodiment shown in FIG. 14(d) the clusters (36) contain different numbers of elongate apertures (2). The elongate apertures of this embodiment are straight-sided and have parallel sides. Arrows labelled 32 show the width of the elongate apertures of this embodiment. The width (32) of the elongate apertures (2) of this embodiment is the same along the entire length (40) of each elongate aperture (2). In addition, the widths (32) of all the elongate apertures (2) are the same. The elongate apertures (2) of this embodiment are arranged with the same distance (38) between an aperture and an adjacent aperture.

In the embodiment shown in FIG. 14(e) the clusters (36) contain 3 elongate apertures (2). The elongate apertures of this embodiment are straight-sided and have parallel sides. Arrows labelled 32 show the width of the elongate apertures of this embodiment. The width (32) of the elongate apertures (2) of this embodiment is the same along the entire length (40) of each elongate aperture (2). In addition, the widths (32) of all the elongate apertures (2) are the same. The elongate apertures (2) of this embodiment are arranged with the same distance (38) between an aperture and an adjacent aperture.

In the embodiment shown in FIG. 14(f) the clusters (36) contain three elongate apertures (2). Each cluster (36) of this embodiment makes up a quarter of a square. The length (40) and width (62) of each cluster is the same. The elongate apertures of this embodiment are straight-sided and have parallel sides. Arrows labelled 32 show the width of the elongate apertures of this embodiment. The width (32) of the elongate apertures (2) of this embodiment is the same along the entire length (40) of each elongate aperture (2). In addition, the widths (32) of all the elongate apertures (2) are the same. The elongate apertures (2) of this embodiment are arranged with the same distance (38) between an aperture and an adjacent aperture.

In the embodiment shown in FIG. 14(g) the clusters (36, 37) contain three elongate apertures (2). The lengths (40) of elongate apertures (2) in the same cluster are the same. However, the lengths of elongate apertures (2) in a third set of clusters (36) are different to the lengths of elongate apertures (2) in a second set of clusters (37). The length (40) of the elongate apertures in the first and second clusters (36) is different from the length (40) of the elongate apertures in the third cluster (37). The elongate apertures of this embodiment are straight-sided and have parallel sides. Arrows labelled 32 show the width of the elongate apertures of this embodiment. The width (32) of the elongate apertures (2) of this embodiment is the same along the entire length (40) of each elongate aperture (2). In addition, the widths (32) of all the elongate apertures (2) are the same. The elongate apertures (2) of this embodiment are arranged with the same distance (38) between an aperture and an adjacent aperture.

FIGS. 14(h)-(i) show arrangements wherein the longitudinal axes (26, 126) of all elongate apertures (2, 102) are parallel. FIG. 14(h) shows an embodiment wherein the elongate apertures (2) are straight-sided and have parallel sides. Arrows labelled 32 show the width of the elongate apertures of this embodiment. The width (32) of the elongate apertures (2) of this embodiment is the same along the entire length (40) of each elongate aperture (2). In addition, the widths (32) of all the elongate apertures (2) are the same. The elongate apertures (2) of this embodiment are arranged with the same distance (38) between an aperture and an adjacent aperture.

FIG. 14(i) shows an embodiment wherein the elongate apertures (102) are straight-sided and have non-parallel sides. Arrows labelled 132 show the maximum widths of the elongate apertures of this embodiment. The maximum widths (132) of all the elongate apertures (102) are the same. The elongate apertures (102) of this embodiment are arranged with the same distance (138) between an aperture and an adjacent aperture.

FIG. 15 shows an embodiment wherein a PEM (43) is placed immediately adjacent to the back surface (8) of a diamond plate (4) electrode. The elongate apertures (2) of this embodiment are straight-sided and have parallel sides. Arrows labelled 32 show the width of the elongate apertures of this embodiment. The width (32) of the elongate apertures (2) of this embodiment is the same along the entire length (40) of each elongate aperture (2). In addition, the widths (32) of all the elongate apertures (2) are the same. The elongate apertures (2) of this embodiment are arranged with the same distance (38) between an aperture and an adjacent aperture. In addition, a further electrode (45) is placed on the other side of the PEM (43).

The invention is further illustrated by the following examples. It will be appreciated that the examples are for illustrative purposes only and are not intended to limit the invention as described above. Modification of detail may be made without departing from the scope of the invention.

EXAMPLES

Example 1

An as-grown diamond plate electrode of dimensions 50 mm×15 mm and thickness 0.5 mm was provided. 96 straight-sided elongate apertures with straight ends and widths of 0.2 mm and a spacing between apertures of 0.3 mm were cut through the entire thickness of the diamond plate electrode into a working area of 48 mm×13 mm using a laser cutting technique from the nucleation surface of the electrode. The elongate apertures were parallel to the longest edge of the diamond plate electrode. The walls of the elongate apertures were tapered at an angle of approximately 4°. The aperture edge lengths measured with respect to the front and back surfaces of the diamond plate electrode were very slightly different, being very slightly higher for the nucleation surface compared with the growth surface.

The nucleation surface of the diamond plate electrode was mounted onto a PEM. For this diamond plate electrode, the aperture edge length per unit working area of the diamond plate electrode, measured on the nucleation surface, was found to be 4.06 mm/mm$^2$.

A further electrode of platinum gauze was mounted on the side of the PEM not attached to the diamond plate electrode.

A cover plate of polyethylene was mounted onto the diamond plate electrode on the side not attached to the PEM. The cover plate was positioned such that each of the 96 elongate apertures was covered in its central portion but was exposed at each end to form a set of aperture inlets and a set of aperture outlets. The distance from the edge of the cover plate to the end of each elongate aperture was about 1.5 mm.

The apparatus comprising the diamond plate electrode, the PEM, the further electrode and the cover plate was enclosed in a reactor having a water inlet and a water outlet. Water to be processed was pumped into the reactor through the water inlet at a pressure of about 1 bar and a flow rate of about 400 cm$^3$/min. The diamond plate electrode was biased as the anode while the further electrode was biased as the cathode. A potential of from 5 to 8 Volts was applied across the diamond plate electrode and the further electrode. The initial rate of ozone production under these conditions was found to be approximately 200 mg/min.

Example 2

An apparatus was prepared as described in Example 1, except that the diamond plate electrode was partially covered with a cover plate of polytetrafluoroethane.

Furthermore, an inlet manifold comprising one fluid inlet aperture and the outlet manifold comprising one fluid outlet aperture were provided. The inlet manifold covered the inlet ends of the elongate apertures while the outlet manifold covered the outlet ends of the elongate apertures.

The surface of the diamond plate electrode immediately adjacent to the cover plate and the inlet and outlet manifolds was processed subsequent to the growth of the plate by lapping and polishing to have a surface roughness, R$_a$, of less than 1 μm. A seal was provided around the periphery of the diamond plate electrode between the surface of the diamond plate electrode and the cover plate, and between the surface of the diamond plate electrode and the inlet and outlet manifolds to prevent leakage of the fluid.

The total cross-sectional area of the passage was approximately 0.096 cm$^2$ and the total passage length was approximately 124 cm.

Pressurised water (at a pressure of about 2 bar) was channelled through the elongate apertures in the region between the cover plate, the PEM and the elongate aperture walls in a forced flow configuration between the inlet ends and the outlet ends of the elongate apertures. The water flowed through the elongate apertures at an average flow rate of approximately 1000 cm$^3$/min. No bubble formation was observed when the potential was applied between the diamond plate electrode and the further electrode. The fluid flow was approximately 173 cm$^3$/sec per cm$^2$ of passage cross section. The fluid flow was approximately 1.4 cm$^3$ per second per cm$^2$ of passage cross section per cm of passage length.

The initial rate of ozone production was found to be approximately 200 mg/min.

The invention claimed is:

1. An electrochemical apparatus for processing a fluid, the apparatus comprising:
   (i) an anode comprising electrically conducting diamond and at least one elongate aperture having a central region and first and second end regions;
   (ii) a proton exchange membrane; and
   (iii) a cover plate;
   wherein the cover plate partially covers the anode such that the central portion of the at least one elongate aperture is covered and the first and second end regions of the at least one elongate aperture are uncovered, thereby forming at least one aperture inlet and at least one aperture outlet, and
   wherein the apparatus is arranged such that when a fluid to be processed is introduced into the apparatus via the at least one aperture inlet there exists at least one three phase interface between the anode, the proton exchange membrane and the fluid to be processed and such that the fluid forming part of the three phase interface undergoes forced flow through the apparatus.

2. The apparatus according to claim 1, wherein the at least one three phase interface is elongate.

3. The apparatus according to claim 2, wherein the apparatus is arranged such that the fluid forming part of the three phase interface undergoes forced flow along a majority of the elongate interface.

4. The apparatus according to claim 1, further comprising at least one inlet manifold covering the at least one aperture inlet and at least one outlet manifold covering the at least one aperture outlet.

5. The apparatus according to claim 1, further comprising a counter reaction fluid and wherein the apparatus is arranged such that the counter reaction fluid is isolated from the fluid to be processed.

6. The apparatus according to claim 5, further comprising means for providing forced flow of the counter reaction fluid through the apparatus.

7. The apparatus according to claim 5, wherein the counter reaction fluid flows in a direction which is substantially aligned with the direction of flow of the fluid to be processed.

8. The apparatus according to claim 1, wherein a cathode is present immediately adjacent to the solid electrolyte.

9. The apparatus according to claim 1, wherein the fluid to be processed is a liquid.

10. The apparatus according to claim 9 wherein the liquid is aqueous.

11. The apparatus according to claim 10 wherein the liquid is water.

12. A method of production of ozone by the electrolysis of water using the apparatus according to claim 11.

13. The method according to claim 12, wherein the ozone treats the water to be processed in order to provide water for human consumption.

* * * * *